United States Patent [19]

Heath

[11] 4,222,371
[45] Sep. 16, 1980

[54] SOLAR ENERGY COLLECTOR

[76] Inventor: George F. Heath, 4626 E. 7th St. #4, Long Beach, Calif. 90804

[21] Appl. No.: 839,269

[22] Filed: Oct. 4, 1977

[51] Int. Cl.$^2$ ............................................. F24J 3/02
[52] U.S. Cl. .................................. 126/440; 126/448; 136/246
[58] Field of Search .................. 237/1 A; 350/175 R; 136/89 PC, 89 H; 126/438, 439, 440, 450, 451, 441

[56] References Cited

U.S. PATENT DOCUMENTS

| | | | |
|---|---|---|---|
| 1,093,925 | 4/1914 | Foresman | 126/271 |
| 1,661,473 | 3/1928 | Goddard et al. | 126/271 |
| 4,069,812 | 1/1978 | O'Neill | 126/271 |

*Primary Examiner*—James C. Yeung
*Attorney, Agent, or Firm*—William C. Babcock

[57] ABSTRACT

A solar energy collector that includes a number of elongate, hollow, metallic, tubular members of such transverse cross section that when disposed side-by-side they define a number of spaced longitudinal apertures through which solar energy rays are directed by lens systems into a number of elongate cavities having dark or black surfaces. The hollow members have the ends so connected to one another that water or other fluid flowing to the collector sequentially traverses the longitudinal passages in the tubular members prior to discharging from the collector. During the flow through the passages heat is transferred to the water or other fluid flowing therethrough from the heated cavities. The solar rays directed by the lens system into the cavities may, if desired, be used to activate photoelectric cells, and the light be transformed directly into electricity.

4 Claims, 6 Drawing Figures

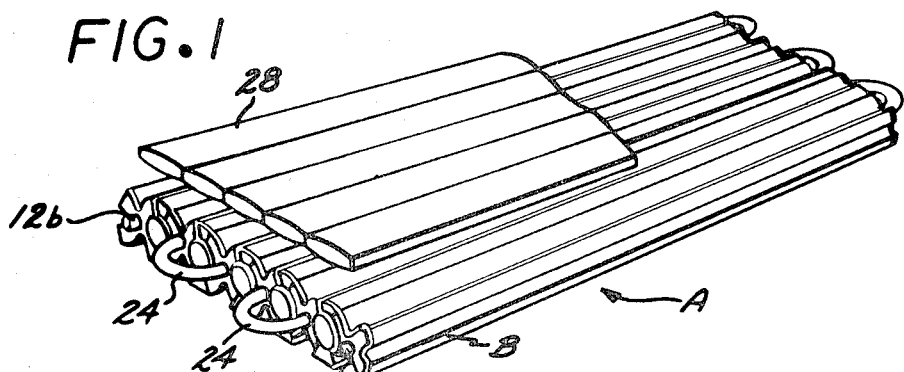
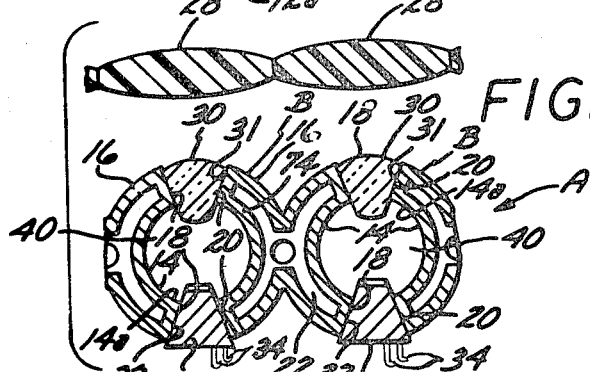
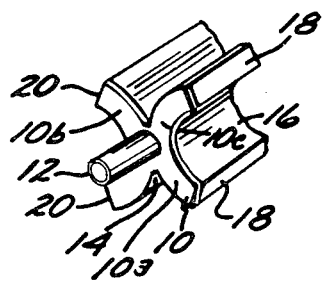
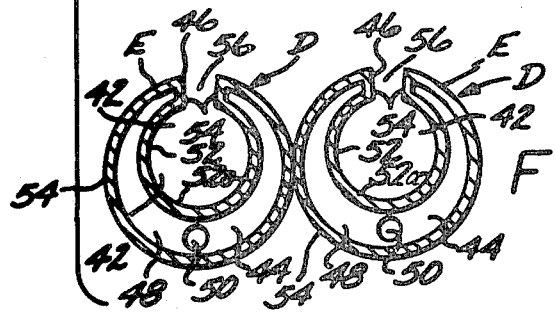
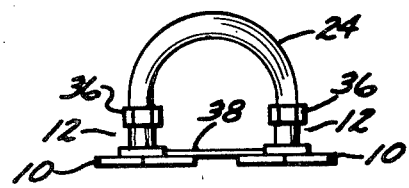

SOLAR ENERGY COLLECTOR

BACKGROUND OF THE INVENTION

1. Field of the Invention

Solar Energy Collector.

2. Description of the Prior Art

In the past it has been common practice to provide black surfaces of substantial size that are exposed to the solar rays and heated as a result thereof, and this heat being transferred to a fluid that is caused to flow in contact with the interior of these surfaces. An apparatus of this type has low efficiency.

The present invention provides a solar energy collector that operates more efficiently than prior art devices of this nature in that at least one lens focuses solar rays into a black surface defined cavity from which heat is transferred to a circulating medium, and the solar energy if desired being used to activate photoelectric cell to generate electricity.

A major object of the present invention is to supply a solar energy collector that is of simple and economical structure, is easy to install and use, and one that substantially eliminates the operational disadvantages of prior art devices of this nature.

Another object of the invention is to supply a solar energy collector that is light in weight, has a low installation cost, and may be formed as a portable panel to permit modular construction.

A still further object of the invention is to furnish a solar energy collector that may be mounted in a conventional frame that is supported on any horizontal, vertical or sloping surface in either a sun-tracking or non sun-tracking position.

Another object of the invention is to furnish a solar energy collector in which the elongate tubular metallic members that form a part thereof are of such transverse cross section that they may be extruded, and be of any desired length or wall thickness.

SUMMARY OF THE INVENTION

The solar energy collector of the present invention includes first, second and third forms. Each of the forms includes a number of elongate, metallic, hollow tubular members that are disposed side-by-side to define a number of longitudinal black surfaced cavities into which solar rays are directed by lens systems. The ends of the passages in the tubular members are connected in staggered relationship whereby the medium to be heated sequentially traverses the longitudinal passages in the tubular member prior to discharging from the collector.

In the first form of solar energy collector a number of elongate collector lens are disposed above the apertures and concentrate and direct the sun's rays into secondary lens disposed in the apertures. The rays are directed into the black surface defined cavities to heat the latter, and this heat being transferred to the medium that flows through the elongate passages in the tubular members. The first form includes a number of photoelectric cells that are activated by solar rays entering the cavities, and these cells transforming the energy of the solar rays directly to electricity.

The second form of the invention is of the same structure as the first form, but does not include the photo electric cells.

The third form of the invention has the black surfaced defined cavities and fluid passage in the tubular members, and the solar rays being directed through the apertures by Frensel lens.

BRIEF DESCRIPTION OF THE DRAWING

FIG. 1 is a perspective view of a first form of the solar energy collector;

FIG. 2 is a fragmentary transverse cross-sectional view of the first form of the invention;

FIG. 3 is a fragmentary transverse cross-sectional view of a second form of the invention;

FIG. 4 is a fragmentary transverse cross-sectional view of a third form of the invention;

FIG. 5 is a fragmentary perspective view of one of the tubular members of the first form of the invention; and FIG. 6 is a top plan view of one of the semi-circular tubular end connectors used on all three forms of the invention.

DESCRIPTION OF THE PREFERRED EMBODIMENTS

The first form A of the solar energy collector A as may best be seen in FIGS. 1, 2 and 5, includes a number of metallic elongate tubular members B that have end pieces 10 on the ends thereof, and the tubular members being disposed side-by-side. Each end piece 10 as may best be seen in FIG. 5 includes first and second arcuate segments 10a and 10b that are disposed back-to-back and extend from one another in opposite directions. Each end piece 10 has a center portion 10 c in which an opening is formed from which a tube 12 extends outwardly.

Each tubular member B is further defined by a pair of inner side walls 14 and a pair of outer side walls 16 that extend longitudinally between the end pieces 10, and the side walls being joined by first and second tapered end walls 18 and 20 as shown in FIG. 5. The end pieces 10, the pairs of inner and outer side walls 14 and 16, and first and second end walls 18 and 20 cooperate to define a longitudinal passage 22 that is in communication with the tubes 12 of a member B. The interior surface of the inner side wall 14 has a black or dark coating 14a thereon.

A number of semi-circular tubular members 24 are provided that by conventional fittings 36 are connected to tubes 12 in staggered relationship as shown in FIG. 1 whereby fluid discharged into tube 12a will sequentially flow through all of the passages 22 prior to exiting through a tube 12b shown FIG. 1.

The solar energy collector A is supported on a desired surface (not shown) in such an orientation that the path of the sun is axially aligned therewith. It is realized that the path of the sun varies with the seasons, and will of course vary with relation to the solar energy collector A. True axial alignment of the solar energy collector A with the path of the sun will be possible only if the collector is movably supported and moved by conventional sun tracking equipment (not shown).

A number of elongate solar ray collecting lens 28 are provided and are disposed above the collector A as shown in FIG. 1, with the lens being substantially parallel to the collector A. The lens 28 are held in this elevated position by conventional means (not shown). The tubular members B when disposed side-by-side as shown in FIG. 1 define first and second longitudinally extending apertures 31 and 33 therebetween, with the first apertures 31 having elongate secondary lens 32 mounted therein, and the second apertures having elongate conventional photo electric cells 32 mounted therein as shown in FIG. 2. Electrical conducting wires 34 extend from the photoelectric cells 32 as illustrated in FIG. 2. The tubular members B are held in fixed transverse by rigid strips 38 that extend between the end pieces 10 as shown in FIG. 6.

The use of the first form A of the solar energy collector is as follows: The medium to be heated is discharged thereinto through the tube 12a to thereafter sequentially flow through the passages 22. The solar rays heat the surfaces 14a and this heat flowing through the inner side walls 14 to heat the medium flowing through the passages 22. The heated medium will discharge from the tube 12b. The rays in cavities 40 will also activate the photoelectric cells 32 to convert the solar energy directly to electricity that flows from the cells through wires 34.

A second form C of the invention is shown in FIG. 3 that is similiar to the first form A. Elements common to the first form A in second form C are identified by the same numerals previously used but with primes being affixed thereto. In the second form C the photo electric cells 32 are eliminated, and the end pieces 10 are of such shape that the lower end walls 18 and 20 are in abutting contact as shown in FIG. 3. The second form C operates in the same manner as the first form A, except for the generation of electric power, and hence no description of the operaton of the second form C is required.

A third form D of solar energy collector is shown in FIG. 4 in which each of the tubular members E not only defines a longitudinal cavity 42 but a water passage 44, as well as a longitudinal aperture 46 in communication with the cavity.

The tubular members E are disposed side-by-side in abutting contact as shown in FIG. 4, with the tubular members having end pieces 48 on the ends thereof in which openings 50 are formed that are in communication with passages 44, and the openings being connected in staggered relationship by tubular members 24 (not shown). Inner side walls 52 and outer side walls 54 extend between the end pieces 48, with the inner and outer side walls being joined by a pair of end walls 54 that define a longitudinal aperture 56 therebetween. A Frensel lens 58 is disposed at a fixed elevation above tubular members E, and directs solar energy rays through the apertures 56 onto black surfaces 52a on the inner side walls 52. The third form D operates in the same manner as the second form C.

The tubular members previously identified can be formed from aluminum, copper or other material having good heat conducting qualities.

The use and operation of the invention has been described previously in detail and need not be repeated.

What is claimed is:

1. A solar energy collector through which a fluid medium may flow to be heated, said solar energy collector including:
    a. a plurality of elongate metallic tubular members that are disposed side-by-side in parallel relationship, each of said tubular members defined by an inner arcuate side wall, an outer arcuate side wall, end walls that connect said inner and outer side walls, a pair of end pieces secured to the ends of said inner, outer and ends walls, said end pieces each having an opening therein, and a pair of tubes in communication with said openings and extending outwardly from said end pieces, said tubular member having a longitudinal passage defined in the interior thereof in communication with said opening, and said tubular members of such transverse cross section that when they are disposed side-by-side in abutting contact they cooperate to define longitudinal first apertures therebetween that are in communication with longitudinal cavities also defined between said tubular members;
    b. first tubular means that so connect said tubes in staggered relationship that a fluid medium discharged into a first of said passages on a first side of said plurality of tubular members sequentially traverses all of said passages prior to discharging from a second of said passages on a second side of said plurality of tubular members;
    c. primary lens means above said plurality of tubular members for collecting solar rays and focusing the same into said first apertures; and
    d. secondary lens means in said first apertures for directing said focused solar rays into said cavities to heat said inner side walls, with heat from said inner side walls flowing therethrough to heat said medium flowing through said passages.

2. A solar energy collector as defined in claim 1 which in addition includes:
    e. a black film on an interior surface of said inner side walls on which said solar rays from said secondary lens means impinge to heat said inner side walls.

3. A solar energy collector as defined in claim 1 in which each of said end pieces is of a configuration that includes two arcuate shaped segments disposed back-to-back and extending away from one another in opposite directions.

4. A solar energy collector as defined in claim 1 in which said tubular members are of such transverse cross section as to define second longitudinal apertures in communication with said cavities, said second apertures oppositely disposed from said first apertures, and said solar heat collector in addition including:
    e. a plurality of elongate photoelectric cells disposed in said second apertures and heated by solar rays directed into said cavities; and
    f. a plurality of electrical conductors for removing electricity from said photo electric cells due to said solar rays being directed thereon in said cavities.

* * * * *